United States Patent
Kulak et al.

[15] 3,643,408
[45] Feb. 22, 1972

[54] PROTECTIVE DEVICE FOR ROTARY MOWERS

[72] Inventors: John Kulak, Port Colborne; Kenneth Lawrence Kirkpatrick, Welland, Ontario, both of Canada

[73] Assignee: Deere & Company, Moline, Ill.

[22] Filed: July 20, 1970

[21] Appl. No.: 56,477

[52] U.S. Cl. .............................................. 56/17.4, 56/295
[51] Int. Cl. ........................................................ A01d 35/26
[58] Field of Search ................... 56/17.4, 295, 320.1, 320.2, 56/255

[56] References Cited

UNITED STATES PATENTS

| | | | |
|---|---|---|---|
| 2,942,400 | 6/1960 | Sylvester | 56/17.4 X |
| 2,547,540 | 4/1951 | Roberts | 56/295 X |
| 2,654,986 | 10/1953 | Gold | 56/295 |
| 2,751,737 | 6/1956 | Herod | 56/295 UX |
| 2,867,963 | 1/1959 | Lawrence et al. | 56/295 |

*Primary Examiner*—Louis G. Mancene
*Assistant Examiner*—J. N. Eskovitz
*Attorney*—H. Vincent Harsha, Harold M. Knoth, William A. Murray, John M. Nolan and Raymond L. Hollister

[57] ABSTRACT

A protective device for use in conjunction with a rotary mower of the type having a housing, a vertical driven shaft extending through the housing, and a cutting blade assembly mounted on the lower end of the shaft, the assembly consisting of a center section rigidly fixed to the shaft for rotation therewith, and a pair of outer sections pivotally connected to the outer ends of the center section. The device, which serves the dual function of, first, limiting the deflection of the center blade section, and, secondly, shielding the vertical shaft and center blade section from stumps and similar obstructions, consists of a circular ring mounted on the housing concentrically with the shaft and having a lower edge terminating in close proximity to the center blade section, the outer circumference of the ring being located just inwardly of the pivotal connection between the center and outer blade sections.

4 Claims, 3 Drawing Figures

PATENTED FEB 22 1972　　　　　　　　　　　　　　3,643,408

*INVENTORS*
JOHN KULAK
KENNETH L. KIRKPATRICK

000
PROTECTIVE DEVICE FOR ROTARY MOWERS

BACKGROUND OF THE INVENTION

The present invention relates generally to rotary mowers and more particularly to a device for both shielding the vertical shaft of such a mower from stumps and similar obstructions, and limiting the vertical deflection of the cutting blade assembly thereof.

Rotary mowers of the heavy duty type, and in particular those designed for cutting heavy underbrush or the like, are often operated under conditions wherein the vertical driven shaft and rotary blade assembly are exposed to highly uneven ground, and to such obstructions as stumps and large rocks. When a high spot in the ground is scalped or an obstruction is encountered by the mower, the blade assembly thereof is generally deflected upwardly toward the mower housing, resulting in high stress levels in and possible serious damage to the blade assembly as well as the driven shaft and mower housing. In addition, the drive shaft is susceptible to damage caused by such obstructions coming in direct contact therewith as the mower is pulled over the ground. The conventional solution to both of these problems has been to simply increase the strength of the affected parts, though practical limitations of cost, weight, and size render this solution not entirely satisfactory.

SUMMARY OF THE INVENTION

It is, accordingly, an object of the present invention to provide a protective device for rotary mowers which is effective to limit the deflection of the rotary blade assembly thereof when the latter encounters a stump or similar immovable obstruction, and to absorb a large percentage of the bending forces which would otherwise be transmitted to the inner portion of the blade and the vertical driven shaft. It is another object of the invention to provide such a device which is effective to shield the vertical driven shaft from direct contact with such obstructions. It is a further object to provide such a device which is effective to limit contact between such obstructions and the rotary blade assembly to the extreme outer end portions of the latter and thereby minimize the reaction force transmitted to the vertical-driven shaft of the mower. It is an additional object to provide such a device that is both simple and economical to manufacture.

The device consists, generally, of a circular ring mounted on the underneath side of the mower housing concentrically with the driven shaft and having a lower edge terminating in close proximity to the upper surface of the center section of the blade assembly. The outer circumference of the ring is disposed just inwardly of the pivotal connection between the center and outer blade sections. In operation, the lower edge of the ring engages the blade when the latter is deflected upwardly upon striking a stump or other obstruction. The device thus limits the vertical deflection of the blade, thereby absorbing those stresses which would otherwise be present in the blade and vertical shaft and preventing the outer tip of the blade from striking the mower housing. In addition, the leading curved surface of the ring is effective to engage such obstructions and deflect the vertical driven shaft around and clear of them as the mower is pulled over the ground.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
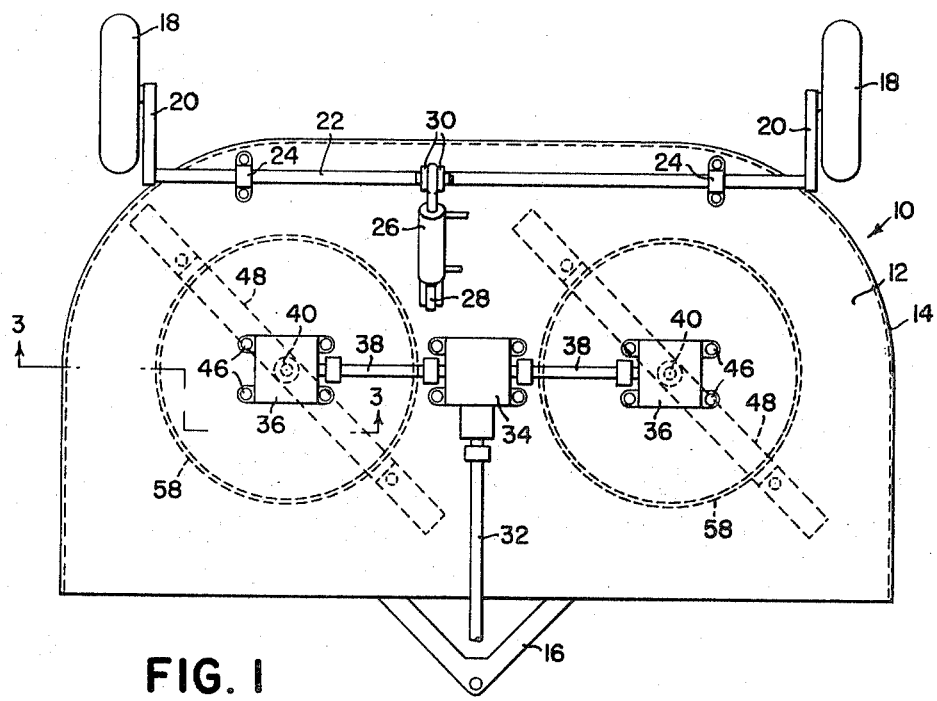
FIG. 1 is a plan view of a rotary mower incorporating the protective device of the invention.

The rotary mower or cutter illustrated in the drawings and embodying the present invention is of the conventional, pull type. Although the mower shown includes a pair of rotary blade assemblies disposed in side-by-side relation, the invention is not limited to mowers employing such a double-blade arrangement; it is equally applicable to mowers having but a single-blade assembly. The mower includes a transversely elongated, D-shaped housing 10 having a flat top portion 12 and a depending sidewall and rear wall 14. The housing is open along its leading transverse edge to permit the entrance of the material to be mowed to the cutting area beneath the portion 12. A V-shaped hitch assembly 16 is fixed to and extends forwardly from the front of the housing 10, the hitch being adapted at its forward end for connection to the drawbar of a conventional agricultural tractor. The rear of the housing is supported on a pair of ground-engaging wheels 18 which, in turn, are rotatably carried on the outer ends of arms 20. The arms 20, in turn, are fixed in parallel relation to opposite ends of a transverse rockshaft 22 supported on the top surface of the portion 12 in U-shaped bearings 24. Vertical adjustment of the wheels 18, for moving the mower between its operating and transport positions as well as adjusting the cutting height thereof, is accomplished in a conventional manner by extension and retraction of a hydraulic ram 26 acting between a bracket 28 fixed to the portion 12 and a pair of arms 30 extending radially from the shaft 22. The ram 26 is actuated by the hydraulic control system contained on the tractor.

The two-blade assemblies of the mower are driven from the power takeoff shaft of the tractor. A fore-and-aft shaft 32 is drivingly connected at its forward end to the tractor power takeoff shaft (not shown) and at its rearward end to the input shaft of a "T" gearbox 34 mounted centrally on the top portion 12 of the mower housing 10. The gearbox 34 has a pair of transversely aligned output shafts extending from its opposite sides which are coupled to the input shafts of identical right angle gearboxes 36 through a pair of short, transverse drive shafts 38. The manner in which the gearboxes 36 are mounted on the top portion 12 of the housing is illustrated best in FIG. 3. As shown therein, each gearbox 36 includes a vertical output shaft 40 which extends downwardly through the top portion 12 and has a rotary blade assembly 42 fixed to its lower end for rotation therewith. From the foregoing, it is apparent that power for driving the blade assemblies 42 is transmitted from the power takeoff shaft of the tractor through the fore-and-aft shaft 32 to the central "T" gearbox 34, thence through the transverse shafts 38 to the right angle gearboxes 36 on opposite sides of the mower longitudinal centerline.

Figure 2:
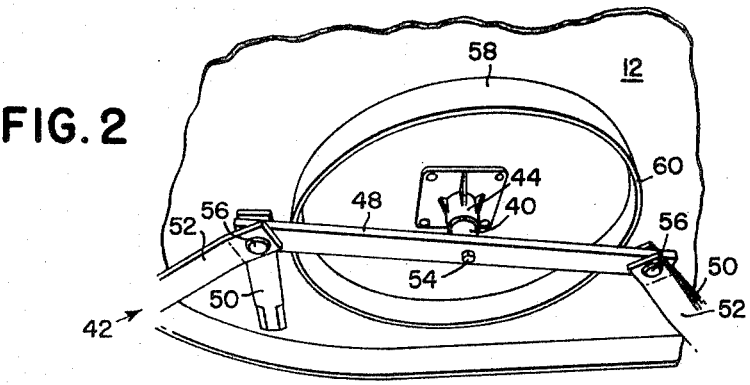
FIG. 2 is a fragmentary perspective view of the underside of the mower of FIG. 1.
Figure 3:
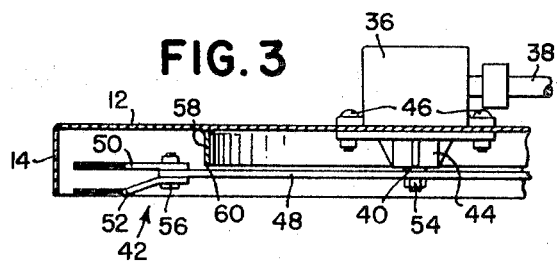
FIG. 3 is an enlarged fragmentary view taken generally along the line 3—3 of FIG. 1.

The vertical output or driven shaft 40 of each of the gearboxes 36 extends downwardly through an aperture in the top portion 12 of the housing, and is supported at its lower end in a bearing member 44. As best shown in FIG. 3, each gearbox 36 is connected to its associated bearing member 44 and to the top portion 12 of the mower housing 10 by means of four nut and bolt assemblies 46. The blade assembly connected to the lower end of the vertical shaft 40 comprises, generally, a center blade section 48 connected at its midpoint to the shaft 40, and a set of upper and lower outer cutting blade sections 50 and 52, respectively, pivotally connected to each end of the section 48. A bolt 54 extends through an aperture in the section 48 and engages a threaded bore in the center of the shaft 40 to rigidly fix the section 48 to the shaft 40 for rotation therewith. A bolt and nut assembly 56 mounts the blades 50 and 52 on the outer end of the section 48 for free swinging movement relative thereto. Although the blade assembly illustrated includes both upper and lower cutting blades 50 and 52, the upper blade 50 is necessary only under certain conditions, and it is contemplated that the mower will often be operated with the upper section 50 removed, leaving only the lower section 52. Centrifugal force normally maintains the sections 50 and 52 in radial alignment with the center section 48 during operation of the mower, as shown in FIG. 1, though they are free to swing out of alignment, as shown in FIG. 2, upon encountering a stump, rock, or similar obstruction.

The structure heretofore set forth is of more or less conventional design; the improvement thereto provided by the present invention will be presently described. The improvement resides in a circular band or ring 58 fixed to the underneath side of the top portion 12 of the housing 10 in concentric relation with each of the vertical-driven shafts 40. The ring includes a relatively thin, vertical, cylindrical wall having an upper edge abutting and fixed to the portion 12, and a lower edge, designated by the numeral 60, extending in close proximity to the outer ends of the center blade section 48. It has been found that best results are obtained with a clearance of approximately one-half inch between the edge 60 and blade 48. The outer circumference of the ring 58, as clearly shown in the drawings, is located just inwardly of the pivotal connection between the center and outer blade sections.

In operation, the ring 58 is effective both to limit the upward deflection of the blade assembly 42 upon its striking an obstruction, and to shield the vertical-driven shaft 40 from direct contact with such obstructions. Should the outer end of the blade assembly scalp the ground or hit an obstruction, the resulting upward deflection thereof will be limited to the clearance provided between the section 48 and edge 60 of the ring 58, and the force tending to produce a greater deflection of the section 48 will be absorbed by the ring 58 and ultimately by the top portion 12 of the housing, rather than transmitted as a bending moment to the shaft 40 and inner portion of the section 48. In addition to absorbing such potentially damaging bending forces, the ring 58 is also effective to prevent the outer end of the upper cutting blade 50 from coming into contact with the portion 12 of the mower housing when the blade assembly is deflected upwardly. The force which might otherwise result in substantial damage to both the blade 50 and housing portion 12 is, instead, safely absorbed by the ring. To most efficiently achieve both of these results, i.e., prevent the transmission of bending loads to the shaft 40 and center portion of the blade section 48, and prevent the outer blade section 50 from hitting the underneath side of the housing portion 12, the edge 60 of the ring must be located just radially inwardly of the pivotal connection at 56 between the center and outer blade sections. If moved further outwardly, the ring would interfere with the free pivotal movement of the upper blade section 50, and if moved further inwardly, the moment arm of the deflecting force would be increased, and the effectiveness of the invention in accomplishing the results outlined would thereby be substantially reduced. A greater distance between the point at which the deflecting force is applied and the point of engagement of the section 48 with the edge 60 would result in a greater force being transmitted to the ring, the inner portion of the section 48, and the shaft 40. Such a greater distance would also increase the upward deflection of the outer end of the blade section 50 for the same deflecting force.

A separate function served by the ring 58 is to prevent stumps and similar obstructions from directly contacting the shaft 40 as the mower is pulled over the ground, and, additionally, to prevent such obstructions from contacting the inner portion of the center blade section 48. If the mower housing is pulled over a stump, for example, the curved leading edge of the ring 58 will contact the stump and cause the entire mower to shift to one side. Contact between the stump and the shaft is thereby entirely prevented, and contact between the stump and center blade section 48 is limited to those portions of the latter extending outwardly of the outer circumference of the ring 58. When the blade section 48 strikes a rigid obstruction, the reaction force acting against the shaft and its supporting structure is inversely proportional to the distance between the shaft and the point at which the force is applied. Thus, by maintaining that distance at a maximum, the ring 58 is effective to maintain the reaction force acting on the shaft at a minimum. It again is apparent that this result is achieved most efficiently by locating the outer circumference of the ring 58 at a point just inwardly of the pivotal connection 56 between the inner and outer blade sections.

We claim:

1. A mower comprising a rigid housing having a substantially horizontal top portion, drive means mounted on the top portion of said housing and including a vertical-driven shaft extending therethrough, a blade assembly connected to the lower end of said shaft for rotation therewith beneath the top portion of said housing, said blade assembly including a first blade section fixed to said shaft and extending radially outwardly therefrom, and a second blade section pivotally connected to the outer end of said first blade section, and means for limiting vertical deflection of said first blade section and for shielding said shaft from stumps and similar obstructions and also limiting horizontal movement of said second blade section, said means comprising a rigid circular ring mounted on said housing concentrically with said shaft and having a horizontal lower edge terminating in close proximity to said first blade section, the outer circumference of said ring being located just radially inwardly of the pivotal connection between said first and second blade sections, said first blade section being deflectable upwardly relative to said housing and into engagement with the lower edge of said ring upon striking an obstruction, said ring and said housing being sufficiently rigid to prevent upward deflection of said first blade section relative to said housing beyond the lower edge of said ring.

2. The invention defined in claim 1 wherein said ring includes a vertical, cylindrical wall having an upper edge disposed closely adjacent to the top portion of said housing.

3. The invention defined in claim 1 wherein said first blade section is horizontal and a lower blade section is pivotally connected to said first blade section and includes a cutting edge offset downwardly from said first blade section.

4. The invention defined in claim 1 wherein said first blade section is horizontal, said second blade section is pivotally mounted on the top surface of said first blade section and extends horizontally therefrom, and the outer circumference of said ring is located sufficiently inwardly of the pivotal connection between said first and second blade sections to permit said sections to assume at least a 90° angle.

* * * * *